United States Patent [19]

Tamai et al.

[11] Patent Number: 4,516,134

[45] Date of Patent: May 7, 1985

[54] INK JET PRINTER SHUT-DOWN CONTROL

[75] Inventors: Masayoshi Tamai; Tetsuo Iyoda; Yukihasa Koizumi, all of Kanagawa, Japan

[73] Assignee: Fuji Xerox Co., Ltd., Japan

[21] Appl. No.: 518,261

[22] Filed: Jul. 28, 1983

[30] Foreign Application Priority Data

Oct. 22, 1982 [JP] Japan ................................ 57-185863

[51] Int. Cl.[3] ................................................ G01D 15/18

[52] U.S. Cl. .................................... 346/75; 346/140 R

[58] Field of Search .............................. 346/75, 140 R

[56] References Cited

U.S. PATENT DOCUMENTS

| | | | |
|---|---|---|---|
| 4,276,554 | 6/1981 | Terasawa | 346/140 R X |
| 4,301,640 | 11/1981 | Miura et al. | 346/140 R |
| 4,311,436 | 1/1982 | Hendriks | 417/2 |
| 4,314,263 | 2/1982 | Carley | 346/140 R X |
| 4,389,657 | 6/1983 | McMahon | 346/140 R |

*Primary Examiner*—E. A. Goldberg
*Assistant Examiner*—Gerald E. Preston
*Attorney, Agent, or Firm*—Sughrue, Mion, Zinn, Macpeak and Seas

[57] ABSTRACT

In an ink jet printer in which a nozzle generates ink drops from ink provided by an ink supply, the energizing signal to the nozzle is gradually decreased when the ink supply pressure is reduced, to avoid misting.

3 Claims, 3 Drawing Figures

INK JET PRINTER SHUT-DOWN CONTROL

BACKGROUND OF THE INVENTION

This invention relates to a drop formation control device in an ink jet printer, in which reliability is improved by eliminating the production of mist so that smudges of the print head section are prevented.

An ink jet printer is known in the art which, for instance, comprises: a drop generator for vibrating an ink stream jetted through the nozzle from the ink chamber, to form ink drops; charging electrodes for charging ink drops according to printing signals; deflecting electrodes for deflecting ink drops according to the amounts of charge applied thereto, so as to fixedly stick them onto a recording sheet; and a gutter for receiving ink drops which move straight through the deflecting electrodes because they have not been charged, to return them into the ink tank.

When, in the printer described above, ink is vibrated at a frequency of 100 to 150 KHz while being continuously supplied, under a predetermined pressure, to the ink chamber by the pump, ink drops are formed at a rate of 100 to $150\times10^3$ drops/second corresponding to the drop-forming frequency. The ink drops are charged according to printing signals while passing through the charging electrodes. Therefore, the ink drops are deflected according to the amounts of charge by the deflecting electrodes so as to fixedly stick on the recording sheet and thereby carry out a printing operation.

FIG. 1 shows the control which is performed by the printer at the end of a printing operation. When the printing operation is stopped at the time instant $t_1$, the ink pressure, e.g. 3 Kg/cm$^2$, is reduced to a value, e.g. 1.5 Kg/cm$^2$, which prevents the entrance of bubbles through the nozzle normally caused by a negative pressure which occurs when the three-way valve means is switched, whereby the ink flow-out speed v is reduced to $v_2$ from $v_1$ (the ink flow-out speed v being represented by $k\sqrt{p}$ ($v=k\sqrt{p}$) where p is the ink pressure and k is a proportional constant). When the ink flow-out speed v is reduced to $v_2$, the three-way valve means is switched so that the supply of ink to the nozzle is closed, as a result of which the nozzle is disconnected from the pressure of the supply pump and ink will not drop from the nozzle of the drop generator. When the flow of ink is stopped at the time instant $t_3$, the drop-forming frequency f is reduced to 0 Hz (with the piezo-electric element of the drop generator being deenergized), formation of ink drops is stopped, and the relevant operations are also stopped.

However, the conventional ink jet printer suffers from the following problem: Even during the period of time (about one second) from $t_1$ to $t_2$ after the ink flow-out speed has been reduced to $v_2$, the formation of ink drops is carried out at the same drop-forming frequency f as that in the steady-state operation in which the ink flow-out speed is $v_1$. Accordingly, the ink flow-out speed and the drop-forming frequency, which are the ink drop forming conditions, are not in agreement with each other, and therefore the formed drops are not uniform, thus producing a mist. As a result, the print head section is smudged. This causes problems in the printer, thus lowering its reliability.

SUMMARY OF THE INVENTION

In view of the foregoing, an object of this invention is to provide a drop formation control device in an ink jet printer, in which, in order to eliminate the production of mist to prevent the print head section from being smudged and to improve the reliability of the printer, the drop forming frequency is changed according to the ink flow-out speed, for instance, at the end of a printing operation in which the ink flow-out speed changes.

BRIEF DESCRIPTION OF THE DRAWINGS

A drop formation control device in an ink jet printer according to this invention will be described in detail with reference to the accompanying drawings, in which.

DETAILED DESCRIPTION OF THE PREFERRED EMBODIMENT

Figure 2:
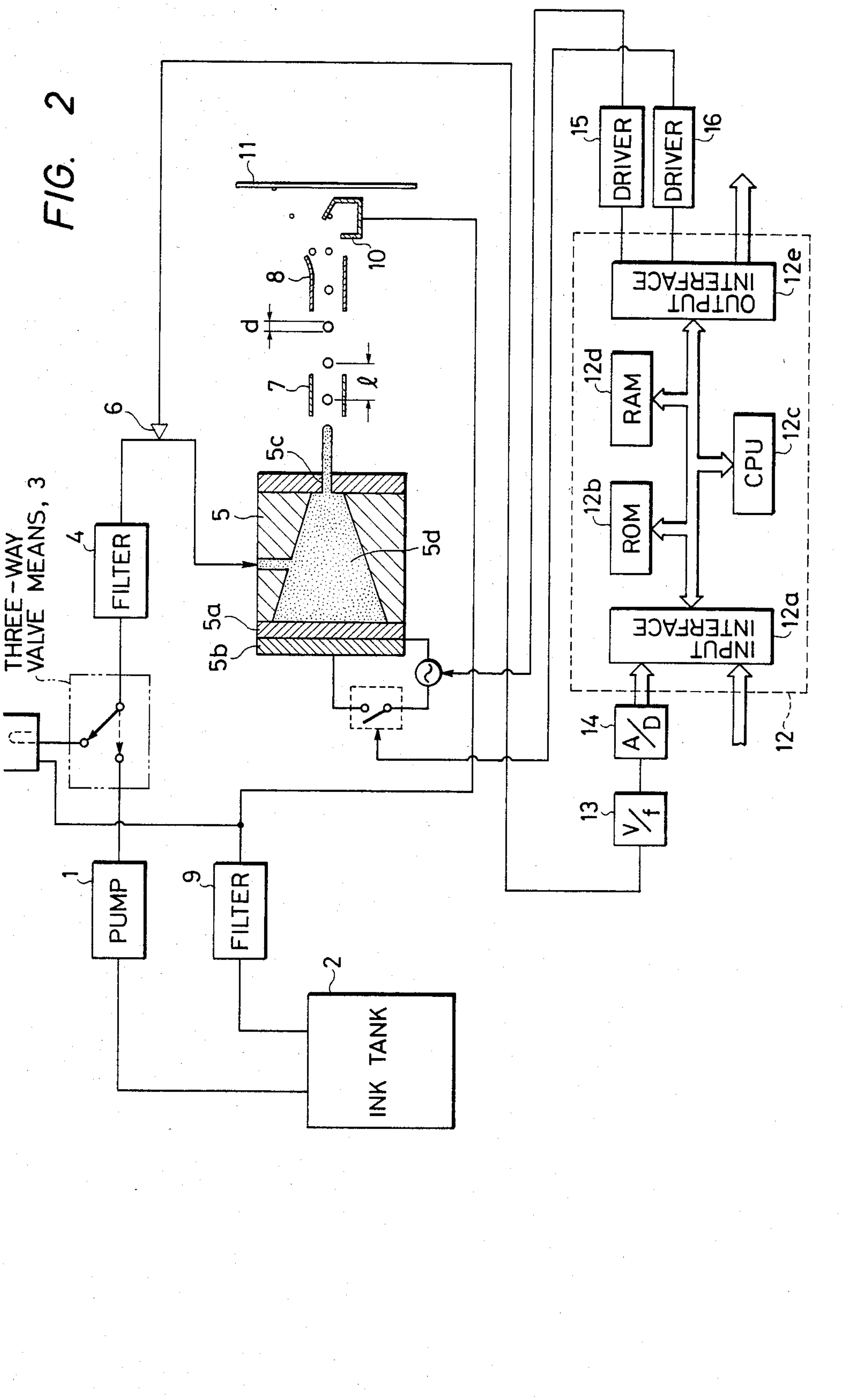
FIG. 2 is an explanatory diagram showing one embodiment of this invention.

One embodiment of the invention is as shown in FIG. 2. A pump 1 for supplying ink under pressure is connected to an ink tank 2. A three-way valve means 3 is connected to the pump 1. The three-way valve means 3 has a first position (as indicated by the dotted line) in which ink is supplied and a second position (as indicated by the solid line) in which overflowing ink is returned to the ink tank. The three-way valve 3 is connected to a filter 4 adapted to filter ink supplied through the three-way valve 3, and the filter 4 is connected to a drop generator 5. A pressure sensor 6 is provided between the filter 4 and the drop generator 5. The drop generator 5 comprises: a piezo-electric element **5*b* joined to a diaphragm 5*a*; and an ink chamber 5*d* having nozzles 5*c* at one side. Charging electrodes 7, deflecting electrodes 8 and a gutter 10 are provided along the path of ink drops which are jetted from the nozzles 5*c*. The gutter 10 is adapted to receive ink drops which have not been deflected, to thereby return them to the ink tank 2 through another filter 9. A recording sheet 11 is placed at a position where ink drops deflected by the deflecting electrodes 8** are received.

A control section 12 is provided to control the above-described ink circulating system. The control section 12 comprises: an input interface **12*a* for inputting operation signals, sensor signals and printing signals; a ROM 12*b* having a program for processing input signals; a CPU 12*c* for processing signals according to the program; a RAM 12*d* for temporarily storing the results of the processing of signals or data; and an output interface 12*e* for outputting control signals according to the signal processing results. The pressure sensor 6 is connected to a v/f converter 13 which operates to convert a voltage value corresponding to a pressure value into a frequency value which is applied to the control section 12 through an A/D converter 14. The control section 12 outputs control signals for controlling a driver 15 adapted to control the lower frequency of the piezo-electric element 5*b*, a driver 16** for controlling the on-off operation of the power source, and other control means (not shown).

Figure 1:
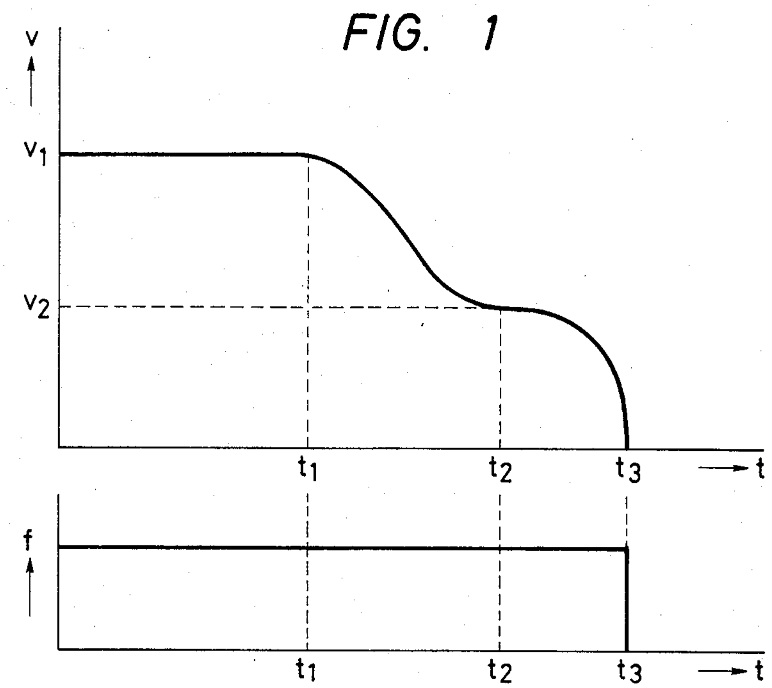
FIG. 1 is a time chart for a description of a convention drop formation control method for an ink jet printer.
Figure 3:
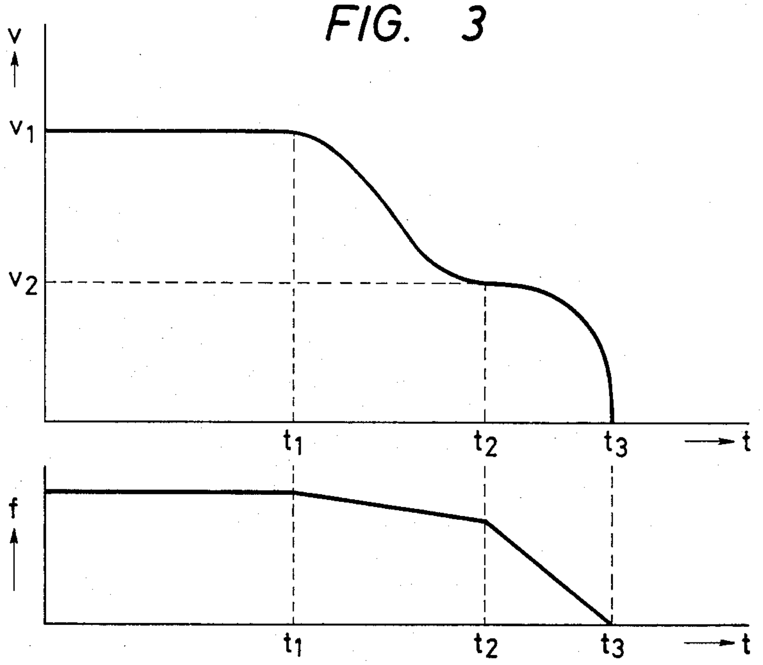
FIG. 3 is a time chart for a description of the operation of the embodiment of FIG. 2.

The operation of the drop formation control device thus constructed will be described with reference to a time chart in FIG. 3. A steady ink jetting operation is continued until the time instant $t_1$. That is, when a printing-operation instructing signal is processed by the control section 12, the pump 1 supplies ink from the ink tank 2 under a predetermined pressure, e.g., 3 $Kg/cm^2$, through the ink supplying path (indicated by the dotted line) of the three-way valve means 3 into the ink chamber 5*d* of the drop generator 5. When, in response to control signals from the control section 12, the driver 16 turns on the power source circuit of the piezo-electric element 5*b* while the driver 16 sets a predetermined drop-forming frequency (for instance 150 KHz), ink is discharged at a rate of $150\times10^3$ drops/second according to an ink flow-out speed $v=v_1$. When the control section 12 controls the amount of charging of the charging electrodes according to a printing signal, ink drops which have not been charged are recovered by the gutter 10, while ink drops which have been charged are deflected by the deflecting electrodes 8 according to the amount of charge, thus being stuck onto the recording sheet. When the printing operation is suspended at the time instant t1, the ink pressure of 3 $Kg/cm^2$ is reduced to 1.5 $Kg/cm^2$, and the three-way valve means 3 is switched by the control section 12 to the second, or open, position (indicated by the solid line) at the time when the ink flow-out speed becomes $v_2$ ($v=v_2$).

When the ink pressure variation is detected by the pressure sensor 6, the detection signal is applied through the v/f converter 13 and the A/D converter 14 to the control section 12. The control section 12 controls the power source of the piezo-electric element 5*b* through the driver 15 so that the drop-forming frequency f is continuously and gradually changed from 150 KHz to 0 Hz over a period of time from the time instant $t_1$ to the time instant $t_3$ in which the ink flow-out speed v is changed from $v_1$ to 0, thus changing the drop-forming condition according to the ink pressure variation.

In the above-described embodiment, the control is such that the drop-forming frequency f is linearly changed. However, the drop-forming frequency f may be decreased to a certain frequency such as 30 or 50 KHz which is lower than that in steady-state operation. The production of mist can be prevented by changing the drop-forming condition as described above.

As is apparent from the above description, in the drop formation control device according to the invention, the drop-forming frequency is changed according to the ink flow-out speed, for instance, at the end of a printing operation in which the ink flow-out speed changes. Accordingly, the production of mist is eliminated, and therefore the print head section is protected from being smudged. That is, according to the invention, one of the troubles which may occur with the ink jet printer is eliminated and the reliability of the latter is improved.

We claim:

1. In an ink jet printer of the type including an ink supply and a drop forming device for receiving ink and for forming ink drops at a frequency in accordance with a control signal, a drop formation control device comprising:

ink jet means for conducting charge-to-deflect ink printing;

ink supply means for supplying ink to said ink jet means;

monitoring means for monitoring the flow of ink through said drop forming device; and control means for gradually reducing the drop formation frequency from a normal operating value to a lower value at the end of a printing operation in response to a corresponding decrease in the monitored ink flow.

2. A drop formation control device as claimed in claim 1, wherein said drop forming device includes vibrating means for vibrating at a vibrating frequency and said drops are formed at a frequency in accordance with said vibrating frequency, said control device adjusting said control signal to vary said vibrating frequency.

3. A drop formation control device as claimed in claim 1, wherein said ink supply provides said ink over a supply means line to said drop forming means and wherein said monitoring means monitors the ink pressure in said supply line.

* * * * *